United States Patent Office 3,285,196
Patented Nov. 15, 1966

3,285,196
APPARATUS FOR CONTROLLING A VEHICLE
WHEN GETTING UNDER WAY
Waltrus L. Livingston, Rochester, N.Y., assignor to General Signal Corporation, Rochester, N.Y., a corporation of New York
Filed June 17, 1964, Ser. No. 375,900
17 Claims. (Cl. 105—61)

The present invention generally relates to vehicle control and more particularly pertains to a system for controlling a vehicle when getting under way.

It is well known that, if a railroad freight train is stopped with the cars fully stretched; i.e. with no slack, and the engineer attempts to apply considerable power (throttle) when subsequently getting under way, wheel slip and possibly even traction motor burnout can occur. Therefore, it often becomes necessary for the engineer to momentarily apply reverse power at the locomotive and thereby bunch the cars, so as to reduce the load on the locomotive, and thus permit an easier starting into motion when forward driving power is next applied. Similar adverse starting conditions also exist when attempting to start such a vehicle after considerable snow has accumulated around the locomotive wheels, and here again it is oftentimes necessary to cycle the vehicle power unit from forward, to reverse, and back to forward driving power delivery condition or wheel slip may occur. This latter condition also often occurs when a person attempts to start an automobile in snow or mud, and, it accordingly becomes necessary to "rock" the vehicle one or more times by operating the vehicle from forward, to reverse, and back to forward gear.

In view of the above, it is proposed in accordance with the present invention to provide a novel method and apparatus for controlling power unit of a vehicle automatically in such a manner so as to facilitate the getting under way under such adverse conditions as noted above. This is particularly desirable for (although not in any way limited thereto) unmanned or automated vehicles without an operator.

More specifically, the vehicle control proposed by this invention involves: supplying or delivering a predetermined amount of forward power for a predetermined time; detecting whether or not the vehicle responds properly to this forward power application by detecting whether or not the vehicle starts in motion; automatically supplying reverse driving power if the vehicle is detected as having failed to initially get under way properly; and, then redelivering the predetermined amount of forward driving power. In order to facilitate the disclosure of the present invention, each such momentary reversing of the power unit and subsequent reestablishing of the forward power condition will hereinafter be considered as a cycling of the vehicle power unit.

If the vehicle still fails to get under way, after the redelivery of forward driving power, the vehicle can be controlled to a shutdown condition, or as an alternative, another power unit cycling operation can be automatically initiated. Thus, if desired, any number of attempts (power unit cyclings) can be made to get the vehicle under way before vehicle shutdown operation occurs.

Although the system of the present invention is applicable for controlling the starting of substantially any type of vehicle, it is illustrated in the selected embodiment shown in the drawings for controlling an unmanned or automated railway vehicle equipped with suitable power unit and braking apparatus. As applied to this automated railway vehicle, the system operated as will be described in more detail hereinafter, to cause a predetermined amount of forward driving power to be developed by the power unit when the vehicle is initially instructed to get under way. A motion detector is provided on the vehicle to determine whether or not the vehicle gets under way properly in response to this predetermined amount of forward driving power. If the motion detector indicates that the vehicle has failed to start in forward motion, a timed delivery of reverse driving power is initiated and, at the end of this reverse power delivery time, the power unit is returned to the forward driving power delivery condition. Should the vehicle now fail to get under way, an automatic brake application is initiated and the vehicle thus controlled to a shutdown condition.

In view of the above, the general object of the present invention is to provide a system and apparatus for controlling a vehicle when getting under way.

A more specific object of the present invention is to automatically control the power unit of a vehicle when attempting to get under way in such a manner that a predetermined amount of forward driving power is initially delivered, a detection is made as to whether or not the vehicle gets under way properly in response to this forward driving power, and, the power unit is then cycled (temporarily reversed and then returned to the forward condition) if the vehicle is detected as having failed to get under way upon the initial forward driving power application.

Another object of the present invention is to provide for automatically controlling the getting under way of a vehicle wherein a plurality of such power unit cycling operations is attempted to facilitate such getting under way; each of said cycling operations including the temporary reversing of the power unit to delivery reverse driving power and subsequent redelivery of forward driving power.

A further object of the present invention is the application of the vehicle control system of the present invention to an automated railway vehicle wherein an automatic brake application is initiated if the vehicle fails to get under way properly.

Other objects, purposes and characteristic features of the present invention will be in part pointed out as the description of the invention progresses and in part be obvious from the accompanying drawings in which.

Figure 1:
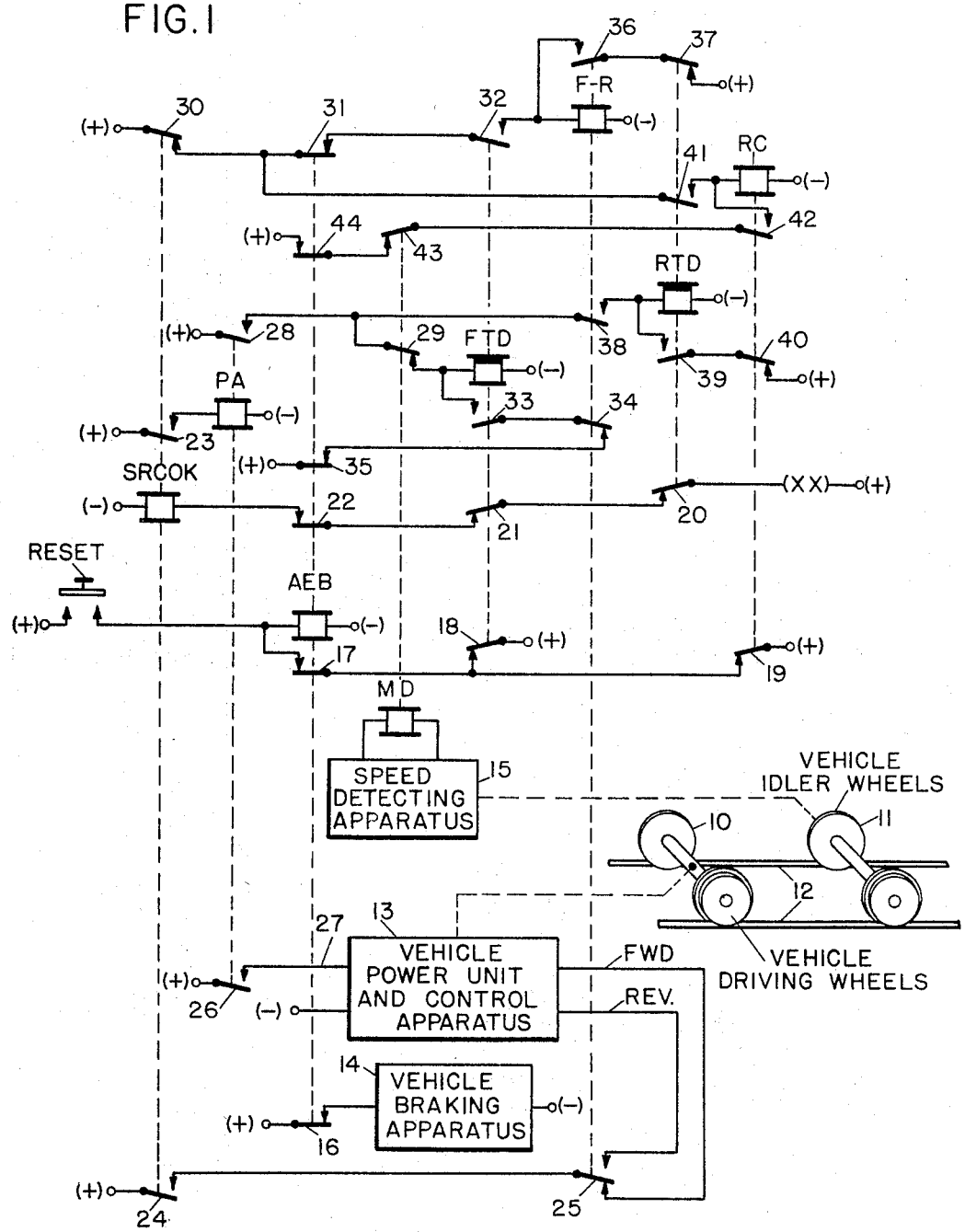
FIG. 1 is a circuit diagram illustrating one embodiment of the present invention adapted for controlling the getting under way of a railway vehicle.

With reference now to FIG. 1 of the accompanying drawings, the invention is illustrated as being specifically adapted for controlling the getting under way of a railway vehicle represented by the driving wheels 10 and idler wheels 11 shown mounted on a portion of track rails 12.

The vehicle is assumed to be equipped with a suitable power unit and associated control apparatus represented by the reference character 13 which also includes directional means for selecting causing the power unit to deliver either forward or reverse driving power in accordance with the selective energization of the control wires labeled FWD and REV respectively. Also included on the vehicle is suitable brake apparatus represented by the reference designation 14 which operates in such a manner that the vehicle braking apparatus is effective to cause application of the vehicle brakes when deenergized, as will be described in detail hereinafter.

Suitable speed detecting apparatus 15 is provided on the vehicle and might, for example, respond to the rotation of the vehicle idler wheels 11 to cause the motion detector relay MD to be energized whenever the vehicle is in motion and to be deenergized when the vehicle is standing still (as illustrated).

The vehicle braking apparatus 14 is controlled by a normally closed front contact 16 of relay AEB (brakes off) which, in turn, is normally retained in its energized condition over a closed stick circuit including its own front contact 17 and back contacts 18 and 19 of relays FTD and RC respectively, connected in multiple.

All of the other relay illustrated in FIG. 1 are normally deenergized. Of these, the relay SRCOK is deenergized until the vehicle is desired to get under way and can be controlled in any number of different ways either manually or automatically, to its energized or picked up condition when the vehicle is to start in motion. In FIG. 1, for example, the symbol (xx) is utilized in the energizing circuit for the relay SRCOK to represent the various control conditions that would normally be met before the relay SRCOK is picked up to register that the train should get under way; e.g. the symbol (xx) might represent the required reception on the vehicle, from the wayside, of a proceed command signal or the like.

Figure 2:
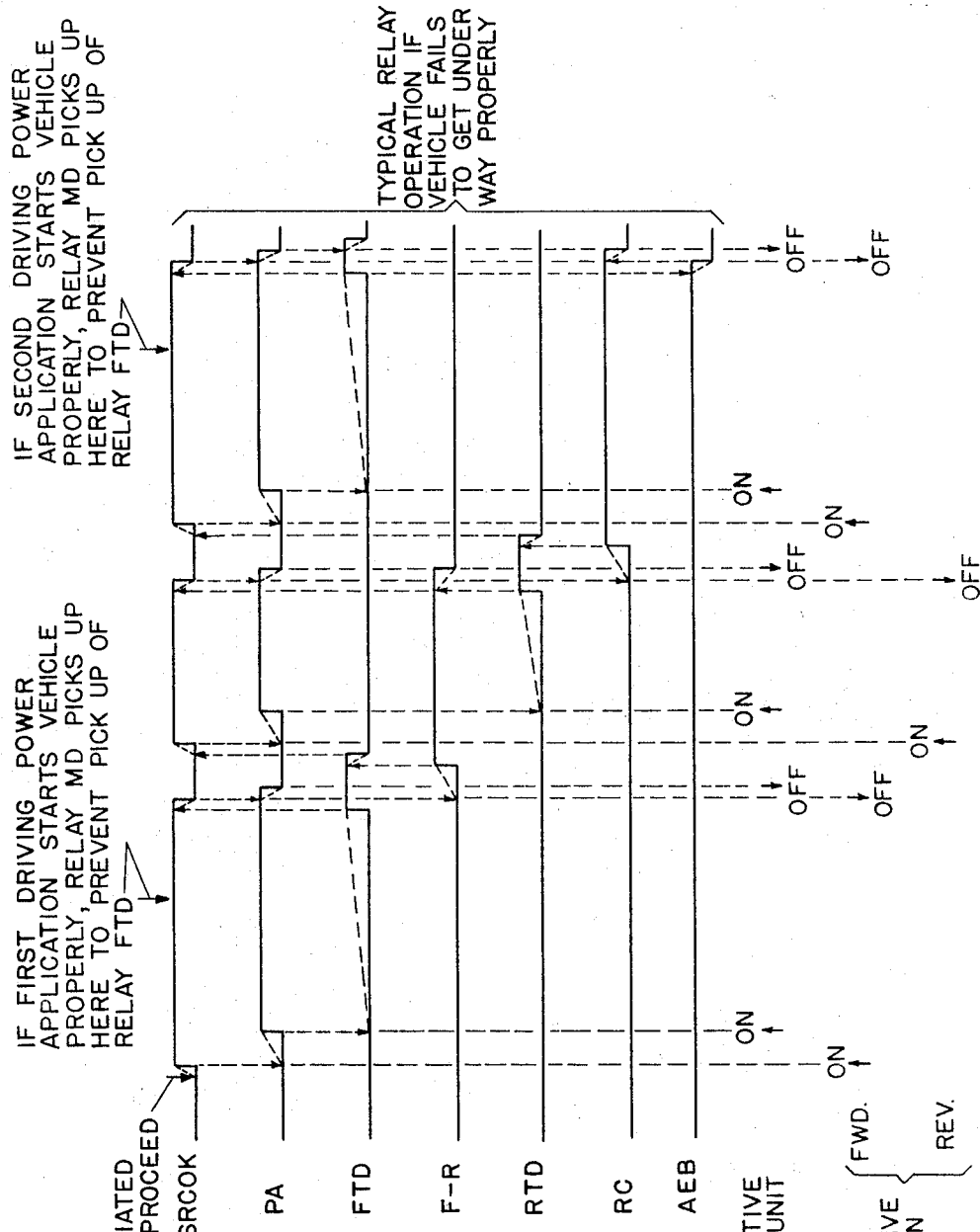
FIG. 2 is a sequence chart illustrating typical operation of the relay circuitry of FIG. 1.

In order to clearly point out how the circuitry of FIG. 1 operates to control the starting in motion of the railway vehicle being controlled, reference should now also be made to the sequence chart of FIG. 2.

More specifically, when the vehicle is to start in motion in response to a proceed command as represented at (xx), the relay SRCOK becomes energized over a circuit including back contacts 20 and 21 of relays RTD and FTD respectively, and front contact 22 of brake control relay AEB. In accordance with this picking up of relay SRCOK, the pick up circuit for power apply relay PA is then completed at front contact 23 of relay SRCOK, and furthermore, the forward control wire FWD is energied over front contact 24 of relay SRCOK and back contact 25 of relay F–R. This energization of control wire FWD controls the vehicle power unit apparatus 13 to supply forward driving power effective to propel the vehicle in the predetermined forward direction. Accordingly, the power applied relay PA which is energized upon closure of front contact 23 of relay SRCOK, is assumed to be somewhat slow in picking up in order the permit the directional apparatus contained in the block 13 to properly condition the power unit for delivering forward power before such power is actually applied to the vehicle driving wheels 10. When the power apply relay PA does pick up and closes its front contact 26, control wire 27 is energized, and, causes the vehicle power unit to deliver a predetermined amount of driving power (in the forward direction) for getting the vehicle under way.

In accordance with the picking up of power apply relay PA, the timing relay FTD is energized by a circuit including front contact 28 of relay PA and back contact 29 of the motion detector relay MD. However, this timing relay FTD has a delayed pick up so that it will not open its back contacts and close its front contacts until after a predetermined time interval has elapsed. This pick up time interval for the relay FTD is preselected to be of a value normally sufficient to permit the vehicle to get under way in response to the forward power delivery; unless the vehicle is attempting to start in motion under some adverse starting conditions such as, for example, the train being fully stretched or too much snow built up under the wheels.

Therefore, should the vehicle properly start in motion (before relay FTD picks up), the speed detecting apparatus 15 responds to the rotation of the idler wheels 11 and causes energization of the motion detector relay MD which, in turn, opens its back contact 29 and thereby prevents any picking up of the relay FTD (see FIG. 2). Thus this picking up of relay MD indicates that the vehicle has gotten under way properly and thereby prevents operation of back contact 18 of the relay FTD and thereby also keeps the stick circuit of the brake control relay AEB intact; i.e. the relay AEB remains picked up to keep the vehicle brakes released.

Conversely, if the vehicle should fail to get under way properly (relay MD remains dropped away) before the relay FTD has timed out and becomes picked up, the back contact 18 of this relay FTD becomes opened in the stick circuit for brake control relay AEB. However, the multiple connected back contact 19 of the relay RC in FIG. 1 retains the brake control relay AEB normally energized to prevent brake application at this time. On the other hand, this picking up of forward timing relay FTD does open its back contact 21 and thereby deenergizes the starting relay SRCOK to, in turn, open front contact 23 and thus drop the power apply relay PA to terminate the forward power application on the vehicle, and subsequently, the reversing relay F–R then becomes picked up by a circuit including back contact 30 of relay SRCOK and front contacts 31 and 32 of relays AEB and FTD respectively, to now partially condition the illustrated vehicle power unit apparatus (front contact 25 is closed) for delivering driving power in the predetermined reverse or opposite direction, when the power apply relay PA is next picked up.

In FIG. 1, it will be noted that until such time as the reverser relay F–R becomes picked up, the forward timing relay FTD is held by a stick circuit including its front contact 33, back contact 34 of relay F–R, and front contact 35 of brake control relay AEB. Subsequently, however, when the reverser relay F–R picks up, as described above, this stick circuit for relay FTD is interrupted at back contact 34 so that the relay FTD then drops away. Additionally, once the relay F–R is picked up, it is retained by a stick circuit including its own front contact 36 and back contact 37 of reverse timing relay RTD.

With forward timing relay FTD now dropped away, it again closes its back contact 21 and thereby reconnects the energizing circuit for the starting relay SRCOK which, in turn, closes its front contact 24 to complete the energizing circuit for control wire REV, and, also closes its front contact 23 which picks up the power apply relay PA to close front contact 26, for energizing control wire 27, and thereby causing the vehicle power unit to now deliver a predetermined amount of driving power in the reverse direction of vehicle travel.

With the power apply relay PA now picked up, to close its front contact 28, the reverse timing relay RTD is now energized over front contact 38 of reverser relay F–R to begin timing this reverse driving power application. The relay RTD is also slow pick up, similar to forward timing relay FTD, but, does have a pick up time that is somewhat less than the pick up time for relay FTD, so that the relay RTD will pick up to end this momentary reverse power application, as will be described, before relay FTD has time to pick up. Until the relay RTD picks up to open its back contact 20, the reverse power application is effective to temporarily power the vehicle in the reverse direction, and, thereby be effective to either bunch the cars of the connected train, free the vehicle wheels in the snow, or otherwise remove the adverse starting condition.

Subsequently, however, as soon as relay RTD times out and opens its back contact 20, the starting relay SRCOK is once more dropped away to deenergize the power apply relay PA and thereby terminate this temporary reverse driving power application. Furthermore, in accordance with the opening of back contact 37 of relay RTD, the reverser relay F–R is now returned to its normal dropped away (forward direction selecting) position. However, this relay F–R is made a little slow releasing to insure that the starting relay SRCOK has returned to its dropped away position wherein front contact 24 is open, so that the power unit reverser will not be actuated during the delivery of driving power. Once the reverse timing relay RTD is picked up, it becomes stuck in its picked up position by a stick circuit including its own front contact 39 and back contact 40 of relay RC.

However, with the starting relay SRCOK now returned to its normal dropped away condition, the completion relay RC becomes picked up over back contact 30 of relay SRCOK and front contact 41 of reverse timing relay RTD to register completion of the momentary reverse power application; which picking up of relay RC furthermore opens its back contact 40 and thereby drops away the reverse timing relay RTD. Subsequently, the relay RC is retained over a stick circuit including its own front contact 42, back contact 43 of motion detector relay MD and front contact 44 of brake control relay AEB. With completion relay RC picked up, the back contact 19 of this relay is now held open in the stick circuit for brake control relay AEB, but, the brakes are not as yet applied since the forward timing relay FTD has previously been returned to its normal dropped away condition (see FIG. 2) wherein its back contact 18 is closed at this time.

Reverse timing relay RTD is now in its released position and thereby closes its back contact 20 to again complete the pick up circuit for starting relay SRCOK which, in turn, picks up the power apply relay PA, as previously described, to return the vehicle to condition wherein the predetermined amount of forward driving power is delivered to the driving wheels 10, by the vehicle power unit apparatus 13 in accordance with the selective energization of control wire 27, over front contact 26 of relay PA, and of forward control wire FWD over front contact 24 of relay SRCOK and the now closed back contact 25 of reverser relay F-R. In addition, the closure of front contact 28 of power apply relay PA now again completes the energizing circuit for the forward timing relay FTD to begin timing this second forward driving power application.

If, during this second application or delivery of forward driving power, the vehicle should properly get under way, the motion detector relay MD will become picked up (as noted in FIG. 2) to open its back contact 29 and thereby interrupt the energizing circuit to prevent pick up of the forward timing relay FTD so that this latter relay cannot operate its back contact 18 and thereby the brake control relay AEB is maintained in its picked up position (front contact 16 remains closed) to keep the vehicle brakes released.

If, however, this redelivery of forward driving power again fails to start the vehicle properly in motion; i.e. relay MD remains dropped away, the forward timing relay FTD will again become picked up to open its back contact 18 in the stick circuit for brake control relay AEB. Consequently, since the back contact 19 of relay RC is now also picked up (to indicate that a power reversal has already been attempted), the stick circuit for brake control relay AEB is now interrupted, and the relay AEB drops away to open its front contact 16 and thereby cause an automatic application of the vehicle brakes 14.

Once the relay AEB has been dropped away, it opens its front contact 22 and thereby prevents further energization of the starting relay SRCOK, and furthermore, opens its front contacts 35, 44 and 31 in the control circuitry of the other relays illustrated in FIG. 1, so that this circuitry can no longer be operated. In this way, the vehicle is placed in a shutdown condition, and, the relay AEB can only be returned to its picked up position to release the vehicle brakes to thereby permit subsequent operation of the automated vehicle, by operation of the RESET push button illustrated in FIG. 1; i.e. a manual resetting of the vehicle control apparatus is required.

From the above description it will be seen that a circuit organization has thus been provided by the present invention effective to automatically control operation of the vehicle power unit apparatus when necessary to facilitate getting the vehicle under way during adverse starting conditions such as when a railway train is stopped with the connected cars fully stretched behind the locomotive, or, when the vehicle being controlled is attempting to get under way in snow or the like.

Figure 3:
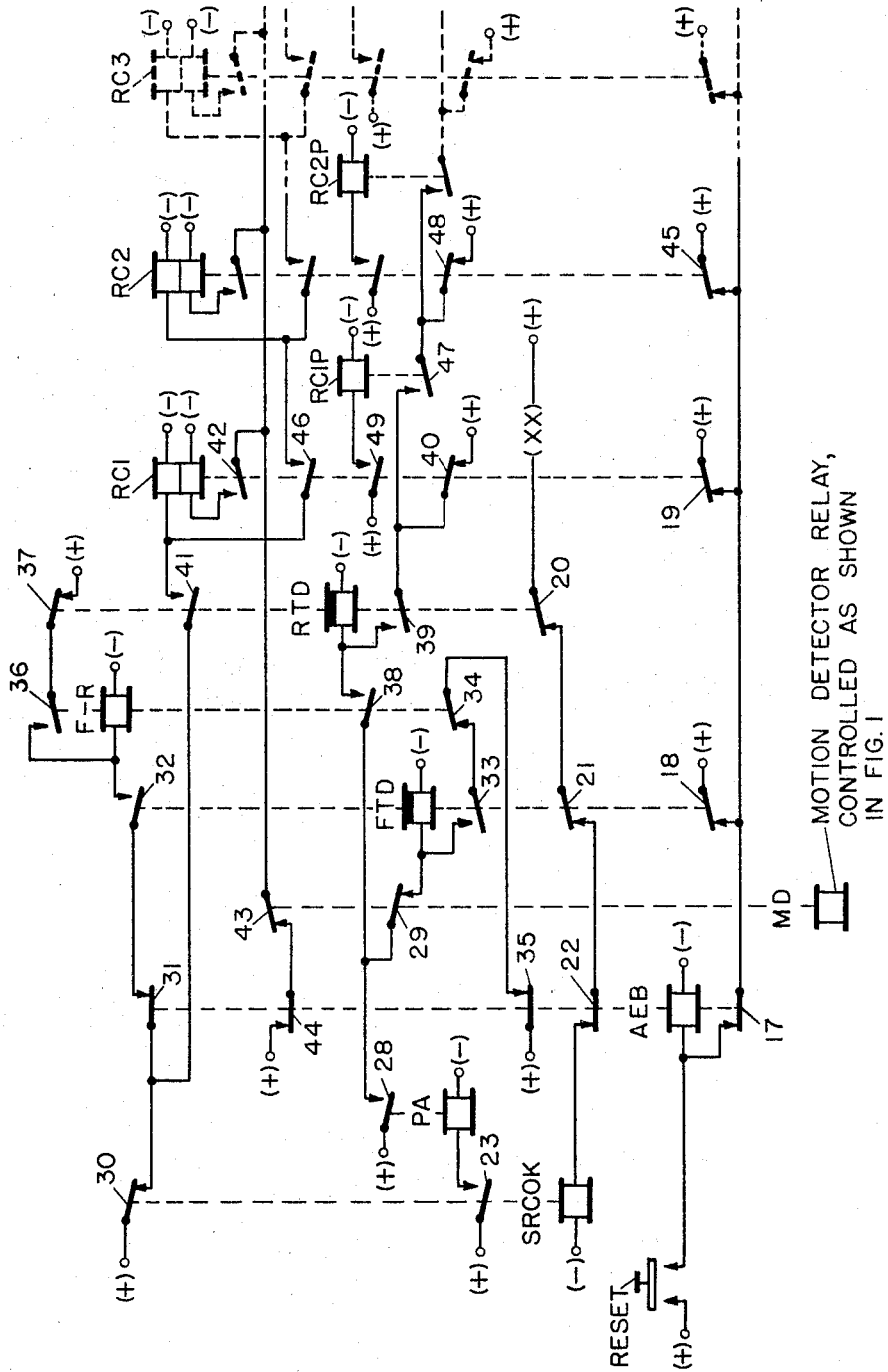
FIG. 3 is a circuit diagram forming a modification of the control circuitry of FIG. 1 to illustrate the added provision of more than one attempted power unit cycling operation while controlling the getting under way of a vehicle.

*Modification of FIG. 3*

As mentioned previously, any number of power unit reversals or cycling operations can be provided according to the system of the present invention, before the automated vehicle is controlled to the shutdown condition; i.e. before the brakes are automatically applied. More specifically, FIG. 3 of the accompanying drawings illustrates typical circuitry for permitting more than one such power unit cycling operation during an attempt to start the vehicle in motion.

This circuitry illustrated in FIG. 3 is substantially the same as that shown in FIG. 1 except that the completion relay RC of FIG. 1 has now been replaced by the two-coil relay RC1 of FIG. 3, and additionally, the relays RC1P, RC2 and RC2P have been added to permit more than a single power unit cycling operation, as will be described. Accordingly, many of the contacts illustrated in FIG. 3 have been designated with exactly the same reference numerals as the corresponding relay contacts illustrated in FIG. 1.

Accordingly, the circuitry illustrated in FIG. 3 operates, for the most part, in exactly the same manner as that illustrated in FIG. 1 (see sequence diagram of FIG. 2) with the exception that the completion relay RC1 in FIG. 3 includes two windings; the upper of which is utilized to pick up the relay RC1P and the lower of which is utilized to hold the relay RC1P in its picked up position when the front contact 42 of the relay is closed. Other than this slight variation, the system of FIG. 3 operates in exactly the same manner as the circuitry of FIG. 1 for the control operations illustrated in the sequence diagram of FIG. 2.

However, after the first cycling operation of the vehicle power unit (see FIG. 1) has been attempted and the vehicle carried apparatus is returned to the condition wherein the predetermined amount of forward power is being delivered by the power unit for a second timed application, the brake control relay AEB in FIG. 3 is not released when the forward timing relay FTD becomes picked up for the second time and opens its back contact 18 in the stick circuit for relay AEB, since a further back contact 45 of relay RC2 is connected in multiple therewith and is effective to retain the brake control relay AEB in its normal picked up position until a second cycling operation of the power unit apparatus has been attempted, as will be described.

More specifically, if the vehicle being controlled fails to get under way properly during the second application of forward driving power (relay MD remains dropped away), so that the relay FTD picks up to open its back contact 18 at the same time that relay RC1 has its back contact 19 open, the reverser relay F-R in FIG. 3 is once again picked up to call for a temporary reverse driving power application over back contact 30 of relay SRCOK and front contacts 31 and 32 of relays AEB and FTD respectively.

In accordance with this picking up of relay F-R, the forward timing relay FTD is returned to its normal dropped away condition by the opening of back contact 34 of relay F-R, and, the starting relay SRCOK is once again picked up to call for reapplication of reverse driving power.

As soon as the reverse timing relay RTD completes its previously discussed timing operation and thereby opens its back contacts 20 and 37, the start relay SRCOK is once again deenergized along with the reversing relay F-R. As a result, the completion relay RC2 now becomes picked up, to register that a second reverse power application has been attempted, over a circuit leading to its upper winding and including back contact 30 of relay SRCOK, front contact 41 of relay RTD, and front contact 46 of relay RC1. However, until such time as the relay RC2 picks up, the relay RTD is held in its picked up position by a stick circuit including its own front contact 39, front contact 47 of repeater relay RC1P, and back contact 48 of relay RC2; the repeater relay RC1P having been previously picked up over front contact 49 of relay RC1.

Since the second attempted reverse power application has now been completed, the back contact 45 of completion relay RC2 is now picked up in the stick circuit for brake control relay AEB. However, since timing relay FTD is now in its dropped away condition, back contact 18 is closed to retain the relay AEB in its normal picked up position.

In accordance with the dropping away of timing relay RTD, when the completion relay RC2 picks up to open its back contact 48, back contact 20 of relay RTD is now closed and returns the starting relay SRCOK to its picked up position wherein the power unit apparatus of the vehicle is once again controlled to supply the predetermined amount of forward driving power; reverser relay F–R also now being dropped away by open back contact 37 of relay RTD to close its back contact 25 (see FIG. 1).

Subsequently, if the ensuing forward power application again fails to start the vehicle in motion; i.e. relay MD remains dropped away, the resulting picking up of forward timing relay FTD and the resulting actuation of its back contact 18, will interrupt the last existing stick circuit for brake control relay AEB and thereby cause the opening of its front contact 16 (see FIG. 1) to thereby initiate an automatic vehicle brake application and result in the vehicle being placed in a shutdown condition requiring manual resetting.

With reference once again to FIG. 3, although only two attempted power unit cycling operations have been considered when discussing the circuitry of FIG. 3, it should be noted that as many power unit cycling operations, as desired, can be incorporated into the illustrated embodiment of the present invention by merely adding more and more completion relays RC3, RC4, etc. together with the corresponding completion repeater relays RC3P, RC4P, etc. as shown dotted in FIG. 3. A back contact of each completion relay added would then be connected in multiple with back contacts 19 and 45 of completion relays RC1 and RC2 respectively in the stick circuit for the brake control relays AEB.

Having thus described a vehicle control system and one modification as specific embodiments of the present invention, it is desired to be understood that these forms have been selected to facilitate in the disclosure of the invention rather than to limit the number of forms which it may assume; and, it should be further understood that various other modifications, adaptations and alterations can obviously be applied to the specific forms shown, to meet the requirements of practice, without in any manner departing from the spirit or scope of the present invention.

What I claim is:
1. In combination,
   (a) a reversible vehicle power unit effective when in an initial condition to produce driving power intended to start a vehicle under way in a first direction of travel, and
   (b) cycling means responsive to the motional status of said vehicle for cycling said power unit if said vehicle fails to get under way in said first direction in response to said initial driving power, said cycling involving the conditioning of said power unit to temporarily produce driving power for the opposite direction of travel followed by the reconditioning of said power unit to reproduce driving power for said first direction.

2. The combination specified in claim 1 further including shutdown means responsive to the motional status of said vehicle for placing said vehicle in a shutdown condition if said vehicle again fails to get under way in said forward direction in response to said reproduced driving power.

3. The combination specified in claim 2 wherein said shutdown means must be manually reset in order to remove said vehicle from said shutdown condition.

4. In a system for controlling a vehicle when getting under way, said vehicle being equipped with a reversible power unit effective to deliver vehicle driving power for first and second directions of vehicle travel, the combination of,
   (a) first control means rendered effective when said vehicle is desired to get under way in said first direction for conditioning said power unit to initially deliver first driving power for said first direction,
   (b) detecting means for detecting whether or not said initial driving power is effective to properly start said vehicle under way in said first direction,
   (c) second control means responsive to said detecting means for conditioning said power unit to temporarily deliver second driving power for said second direction of travel if said vehicle fails to properly start under way in said first direction, and
   (d) third control means rendered effective after said second power delivery for thereafter conditioning said power unit to redeliver first driving power.

5. The combination as specified in claim 4, wherein said detecting means includes
   (a) timing means set into operation in response to the beginning of the delivery of said first driving power by said power unit for timing out of predetermined time interval,
   (b) motion detector means for detecting whether or not said vehicle is in motion in said first direction,
   (c) means responsive to said timing means and said motion detector means for selectively registering whether or not said vehicle has properly started under way in said first direction in accordance with respectively whether or not said motion detector means detects motion of said vehicle prior to the completion of the timing operation by said timing means.

6. The combination specified in claim 4 wherein said vehicle is equipped with braking apparatus and further including brake control means responsive to said third control means effective to cause an automatic application of said braking apparatus if said vehicle fails to get under way in said first direction in response to said redelivery of said first driving power.

7. The combination specified in claim 6 wherein said brake control means is a relay effective when deenergized to initiate said brake application, said relay being normally energized to prevent said brake application over an energizing circuit including,
   (a) first and second contacts connected in multiple,
   (b) said first contact being actuated to an open-circuit condition at the completion of said temporary second driving power delivery, and
   (c) said second contact being actuated at an open-circuit condition if said vehicle fails to get under way in said first direction in response to said redelivery of said first driving power, whereby said energizing circuit becomes open-circuited to deenergize said relay upon actuation of said third contact.

8. The combination specified in claim 4 wherein said third control means include,
   (a) second timing means set into operation in response to the beginning of the delivery of said second driving power by said power unit for timing out a predetermined time interval during which said power unit delivers said second driving power, and
   (b) means rendered effective at the completion of the timing operation by said second timing means for conditioning said power unit to again deliver said first driving power.

9. In a system for controlling a vehicle when getting under way, said vehicle being equipped with a reversible power unit effective to deliver vehicle driving power for first and second directions of vehicle travel, the combination of,
   (a) first power unit control means rendered effective when said vehicle is desired to get under way in said first direction for conditioning said power unit to initially deliver first driving power for said first direction,
   (b) detecting means responsive to motion of said vehicle for detecting whether or not said initial driving power is effective to start said vehicle under way in said first direction,
   (c) second power unit control means responsive to said detecting means for cycling said power unit if said vehicle fails to get under way in response to said first driving power, the cycling of said power unit involving the conditioning of said power unit for temporarily delivering second driving power for said second direction of travel followed by the return of said power unit to the condition for redelivery of said first driving power.

10. The combination specified in claim 9 wherein
   (a) said detecting means is furthermore effective to detect whether or not said redelivery of first driving power is effective to start said vehicle under way in said first direction, and wherein
   (b) said second power unit control means is furthermore responsive to said detecting means for again cycling said power unit if said vehicle fails to get under way in response to said redelivery of first driving power.

11. In combination,
   (a) a reversible vehicle power unit effective when in a first condition to produce first driving power intended to start a vehicle under way in a first direction of travel,
   (b) power unit cycling means capable when rendered effective to operate said power unit through a cycling operation, said cycling operation involving the conditioning of said power unit to temporarily produce driving power for the opposite direction of travel followed by the reconditioning of said power unit to reproduce first driving power for said first direction, and
   (c) cycling control means responsive to the motional status of said vehicle for repeatedly rendering said cycling means effective for a predetermined number of times as long as said first driving power when produced fails to start said vehicle under way in said first direction.

12. The combination specified in claim 11 wherein said cycling control means include means responsive to motion of said vehicle for rendering said power unit cycling means ineffective if said vehicle starts under way in said first direction.

13. The combination specified in claim 11 further including shutdown means responsive to said cycling control means for placing said vehicle in a shutdown condition if said vehicle has failed to get under way in said forward direction after said cycling means has been rendered effective for said predetermined number of times.

14. In a system for controlling a vehicle when getting under way, said vehicle being equipped with a reversible power unit effective to deliver vehicle driving power for first and second directions of vehicle travel, the combination of,
   (a) first control means rendered effective when said vehicle is desired to get under way in said first direction for conditioning said power unit to deliver first driving power for said first direction,
   (b) detecting means for detecting whether or not said first driving power is effective to start said vehicle under way in said first direction, and
   (c) power unit cycling means operable in response to detecting means for repeatedly cycling said power unit a plurality of times as long as said vehicle fails to get under way in said first direction, each cycling of said power unit involving the conditioning of said power unit for temporarily delivering second driving power for said second direction followed by the return of said power unit to the condition for redelivery of said first driving power, said detecting means being effective to interrupt the operation of said power unit cycling means if a redelivery of said first driving power starts said vehicle under way in said first direction.

15. The combination specified in claim 14 further including means responsive to said power unit cycling means effective to place said vehicle in a shutdown condition if said vehicle has failed to get under way at the completion of said plurality of power unit cyclings.

16. The combination specified in claim 15 wherein the means effective to place said vehicle in said shutdown condition includes,
   (a) a brake control relay effective when deenergized to cause a braking application on said vehicle, and
   (b) a normally closed energizing circuit for said relay including a plurality of contacts connected in multiple with one another and each being open-circuited at the completion of an associated one of said plurality of power unit cyclings, whereby said energizing circuit becomes open-circuited to deenergize said relay if said vehicle has failed to get under way upon completion of all of said plurality of cyclings.

17. In a system for controlling a vehicle when getting under way, said vehicle being equipped with braking apparatus and a reversible power unit effective to deliver vehicle driving power for opposite directions of vehicle travel, the combination of,
   (a) power application control means effective when selectively energized and deenergized to respectively initiate and terminate the delivery of driving power by said power unit and having an energizing circuit initially completed to energize said power application control means and thereby initiate a first delivery of first driving power when said vehicle is desired to get under way in a first direction,
   (b) motion detector means for detecting motion of said vehicle in said forward direction,
   (c) a first timing means effective while energized to time out a first predetermined time interval and having an energizing circuit completed to energize said first timing means only when said power application control means is energized and no motion is detected by said motion detector means,
   (d) means responsive to said first timing means for interrupting the energizing circuit for said power application control means upon completion of said first predetermined time interval to thereby terminate said first power delivery,
   (e) reversing means effective when energized to condition said power unit for delivery of second driving power for the opposite direction of travel and having a normally open energizing circuit completed to energize said reversing means at the completion of said first predetermined time interval.
   (f) means rendered effective when said reversing means is energized for resetting said first timing means to thereby reestablish the energizing circuit for said power application control means and initiate delivery of said second driving power,
   (g) a second timing means effective when energized to time out a second predetermined time interval and having an energizing circuit completed when said power application control means and said reversing means are concurrently energized,
   (h) means responsive to said second timing means effective to, (1) interrupt the energizing circuit for said power application control means upon completion of said second predetermined time interval to thereby terminate said second power delivery,
(2) deenergize said reversing means at the completion of said second predetermined time interval for reconditioning said power unit to redeliver said first driving power, and
(3) subsequently reestablish the energizing circuit for said power application control means to initiate redelivery of said first driving power, (i) braking control means effective only when energized to prevent an automatic application of said vehicle braking apparatus, and
(j) means for deenergizing said brake control means if said motion detector fails to detect motion of said vehicle in said first direction during said redelivery of said first driving power.

No references cited.

MILTON BUCHLER, *Primary Examiner.*

S. B. GREEN, *Assistant Examiner.*